(12) United States Patent
Takada et al.

(10) Patent No.: US 8,406,580 B2
(45) Date of Patent: Mar. 26, 2013

(54) PLANAR LIGHTWAVE FOURIER-TRANSFORM SPECTROMETER MEASUREMENT INCLUDING PHASE SHIFTING FOR ERROR CORRECTION

(75) Inventors: Kazumasa Takada, Gunma (JP); Katsunari Okamoto, Ibaraki (JP)

(73) Assignees: AiDi Corporation, Ibaraki (JP); GUNMA University, Guma (JP)

( * ) Notice: Subject to any disclaimer, the term of this patent is extended or adjusted under 35 U.S.C. 154(b) by 118 days.

(21) Appl. No.: 13/192,577

(22) Filed: Jul. 28, 2011

(65) Prior Publication Data

US 2012/0050744 A1    Mar. 1, 2012

Related U.S. Application Data

(60) Provisional application No. 61/368,419, filed on Jul. 28, 2010.

(51) Int. Cl.
*G02B 6/12* (2006.01)
*G01J 3/45* (2006.01)

(52) U.S. Cl. ........ 385/14; 385/3; 385/31; 385/129; 385/130; 385/131; 385/132; 356/451

(58) Field of Classification Search ............ 385/1, 2, 385/3, 14, 15, 30, 31, 42, 129, 130, 131, 385/132; 356/73.1, 300, 451
See application file for complete search history.

(56) References Cited

U.S. PATENT DOCUMENTS

| 4,840,447 | A | 6/1989 | Kataoka |
| 5,644,125 | A | 7/1997 | Wobschall |
| 6,049,640 | A | 4/2000 | Doerr |
| 6,175,671 | B1 | 1/2001 | Roberts |
| 6,408,111 | B1 * | 6/2002 | Doerr et al. ........... 385/3 |
| 6,845,185 | B2 | 1/2005 | Kim et al. |
| 6,961,492 | B2 * | 11/2005 | Doerr ............... 385/39 |
| 7,106,923 | B1 * | 9/2006 | Doerr ............... 385/15 |
| 7,317,535 | B2 | 1/2008 | Cheben et al. |
| 7,444,048 | B2 * | 10/2008 | Peters et al. .......... 385/37 |

(Continued)

FOREIGN PATENT DOCUMENTS

WO    WO 2007/133066 A2    11/2007

OTHER PUBLICATIONS

Notification of Transmittal of the International Search Report and the Written Opinion for PCT Application No. PCT/US2011/045650 (PCT Publication No. WO 2012/015995), dated Feb. 17, 2012.

(Continued)

*Primary Examiner* — Brian Healy
(74) *Attorney, Agent, or Firm* — Jeffrey Klembczyk, Esq.; Kevin P. Radigan, Esq.; Heslin Rothenberg Farley & Mesiti P.C.

(57) ABSTRACT

A transform spectrometer measurement apparatus and method for a planar waveguide circuit (PLC). The spectrometer typically includes an input optical signal waveguide carrying an input optical signal; a plurality of couplers, each connected to the input optical signal waveguide, and each including a coupler output for carrying a coupled optical signal related to the input optical signal; and an array of interleaved, waveguide Mach-Zehnder interferometers (MZI), each having at least one input MZI waveguide, each MZI input waveguide receiving a coupled optical signal from a respective coupler output. A phase shifting circuit is applied to at least one arm of the MZIs to induce an active phase shift on the arm to thereby measure phase error in the MZIs. Light output from the MZIs is measured under intrinsic phase error conditions and after an active phase shift by the phase shifting circuit.

13 Claims, 5 Drawing Sheets

U.S. PATENT DOCUMENTS

| | | | |
|---|---|---|---|
| 8,098,379 B2 * | 1/2012 | Okamoto | 356/451 |
| 2003/0063834 A1 | 4/2003 | Godbout et al. | |
| 2006/0039704 A1 | 2/2006 | Nara et al. | |
| 2009/0316159 A1 | 12/2009 | Scott | |
| 2010/0245831 A1 | 9/2010 | Okamoto | |
| 2012/0050744 A1 * | 3/2012 | Takada et al. | 356/451 |

OTHER PUBLICATIONS

Florjanczyk et al., "Multiaperture Planar Waveguide Spectrometer Formed by Arrayed Mach-Zehnder Interferometers", Optics Express, Vo. 15, No. 26 (Dec. 2007).

Cheben et al., "Wavelength-Dispersive Device Based on a Fourier-Transform Michelson-Type Arrayed Waveguide Grating", Optics Letters, vol. 30, No. 14 (Jul. 15, 2005).

Bacon et al., "Miniature Spectroscopic Instrumentation: Applications to Biology and Chemistry", Review Article, Review of Scientific Instruments, vol. 75, No. 1 (Jan. 2004).

Harlander et al., "Spatial Heterodyne Spectroscopy for High Spectral Resolution Space-Based Remote Sensing", Optics & Photonics News (Jan. 2004).

Cheben et al., "Multiaperture Planar Waveguide Spectrometer Formed by Arrayed Mach-Zehnder Interferometers", Optics Express, vol. 15, No. 26, 18176-18189 (Dec. 24, 2007).

Notification of Transmittal of the International Search Report and the Written Opinion of the International Searching Authority, International Search Report and Written Opinion, issued for PCT/US2010/025040, dated Sep. 30, 2010.

Notice of Allowance for U.S. Appl. No. 12/710,765 (U.S. Patent Publication No. 2010/0245831 A1), dated Nov. 17, 2011.

* cited by examiner

US 8,406,580 B2

PLANAR LIGHTWAVE FOURIER-TRANSFORM SPECTROMETER MEASUREMENT INCLUDING PHASE SHIFTING FOR ERROR CORRECTION

RELATED APPLICATION INFORMATION

This application claims priority to U.S. Provisional Patent Application entitled PLANAR LIGHTWAVE FOURIER-TRANSFORM SPECTROMETER INCLUDING PHASE SHIFTING FOR ERROR CORRECTION, filed Jul. 28, 2010, as Ser. No. 61/368,419, which application is hereby incorporated by reference herein in its entirety. This application is also related to U.S. patent application entitled PLANAR LIGHTWAVE FOURIER-TRANSFORM SPECTROMETER, filed Feb. 23, 2010, as Ser. No. 12/710,765 now U.S. Pat. No. 8,098,379, which Application is also hereby incorporated herein by reference in its entirety.

TECHNICAL FIELD

The present invention relates in general to planar lightwave circuits. More particularly, the present invention relates to a planar lightwave, Fourier-transform spectrometer measurement apparatus and method.

BACKGROUND OF THE INVENTION

High-resolution and miniaturized spectrometers without moving parts have a great potential for use in optical fiber communication networks, environmental sensing, and medical diagnostics. Spatial heterodyne spectroscopy (SHS) is an interferometric technique that uses the Fourier transformation of the stationary interference pattern from Mach-Zehnder interferometers (MZIs). The planar waveguide version of the SHS architecture is one of the key solutions, since the MZI array can be fabricated on one substrate.

The actual optical delays of the fabricated MZIs are likely to deviate from their designed values and the phase error frozen in each MZI may prevent one from producing the correct spectrum.

This invention addresses the problem of assessing the potential errors in the spectrum produced by such spectrometers.

SUMMARY OF THE INVENTION

The shortcomings of the prior art are addressed, and additional advantages are provided by the present invention which in one aspect is a transform spectrometer measurement apparatus and method for a planar waveguide circuit (PLC). The spectrometer typically includes an input optical signal waveguide carrying an input optical signal; a plurality of couplers, each connected to the input optical signal waveguide, and each including a coupler output for carrying a coupled optical signal related to the input optical signal; and an array of interleaved, asymmetrical waveguide Mach-Zehnder interferometers (MZI), each having at least one input MZI waveguide, each MZI input waveguide receiving a coupled optical signal from a respective coupler output. A phase shifting circuit can be applied to at least one arm of the MZIs to induce an active phase shift on the arm to thereby measure phase error in the MZIs. Light output from the MZIs is measured under intrinsic phase error conditions and after an active phase shift by the phase shifting circuit.

In one embodiment, the phase shifting circuit comprises a heater operating under a thermo-optic effect. The heater may be applied to a longer arm of the assymetrical MZIs.

At least some of the input MZI waveguides may intersect in a common layer of the PLC, at an angle which allows their respective coupled optical signals to transmit without unacceptable attenuation, in one embodiment at an angle greater than about 45°. Dummy crossing waveguides may be placed such that the total number of waveguide crossings is equal for each MZI waveguide.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed at the conclusion of the specification. The foregoing and other objects, features, and advantages of the invention are apparent from the following detailed description taken in combination with the accompanying drawings in which:

DETAILED DESCRIPTION OF THE INVENTION

Figure 1:
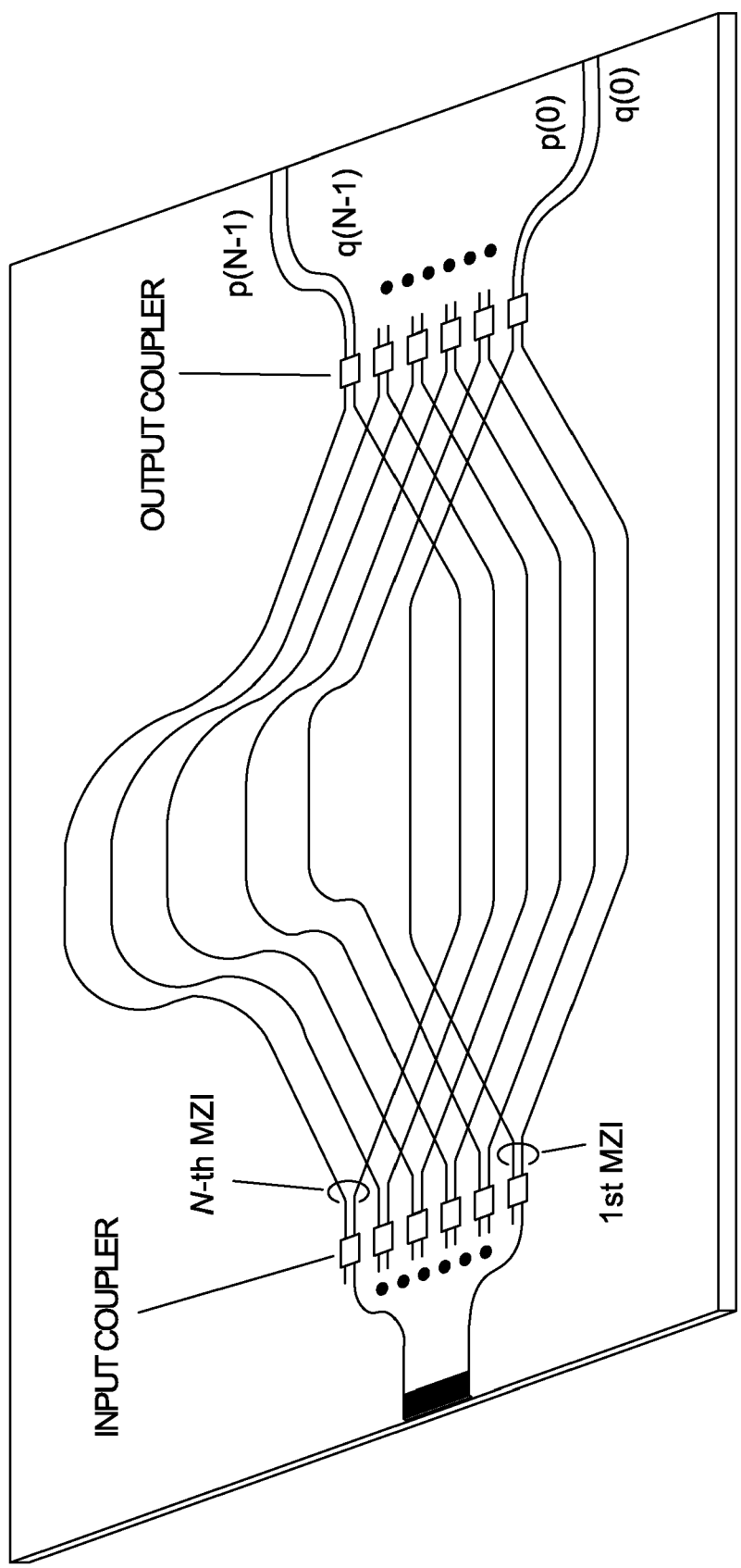
FIG. 1 is a schematic of a spectrometer configuration with an interleaved MZI array.

FIG. 1 is a schematic of a PLC spectrometer configuration having an interleaved MZI array. The total number of MZIs is N and path length difference increment is $\Delta L=162$ μm. The waveguide core size in this example is $4.5 \times 4.5$ μm$^2$ with a 1.5% refractive-index difference. The minimum bend radius is 2 mm. White boxes indicate 3-dB couplers consisting of either directional couplers or multimode interference couplers. Waveguide arms in the MZIs may be intentionally inclined to both sides so that the waveguides intersect by more than 45° with each other. The excess loss of the waveguide crossing can be reduced as low as ~0.02 dB/intersection when the crossing angle is larger than 45°. Dummy crossing waveguides can also be placed to make the total number of waveguide crossing equal for all MZIs. Both cross port and through port outputs p(k) and q(k) in the k-th (k=0~N−1) MZI can be measured so that the spatial non-uniformity of the input light distribution can be corrected. For a signal s(f) passing through the k-th MZI, a normalized cross port output is given by assuming negligible waveguide loss as $$P(k) = \frac{p(k)}{p(k)+q(k)} = \frac{1}{S}\int_{f_0}^{f_0+FSR} s(f)\frac{[1+\cos(\beta k \Delta L)]}{2} df \quad (1)$$

$$(k = 0 \sim N-1),$$

where $\beta$ is a propagation constant, FSR is a free spectral range determined by $\Delta L$ and $$S = \int_{f_0}^{f_0+FSR} s(f) df.$$

$f_0$ is denoted as the Littrow frequency at which phase delays in different MZIs become integer multiples of $2\pi$ ($\beta(f_0) \Delta L = 2m\pi$). Since MZI response repeats periodically with FSR, one needs to block the unnecessary spectral range by a bandpass filter. Based on the discrete cosine Fourier transform, the input spectrum $s(f_n)$ ($f_n = f_0 + n \cdot FSR/\hat{N}$, where $\hat{N}=2N$) can be calculated from the measured output power $P(k)$ as $$s(f_n) = A \sum_{k=0}^{\hat{N}-1} P(k) \cos\left(2\pi \frac{nk}{\hat{N}}\right) \quad (n = 0 \sim N-1). \quad (2)$$

Figure 2A:
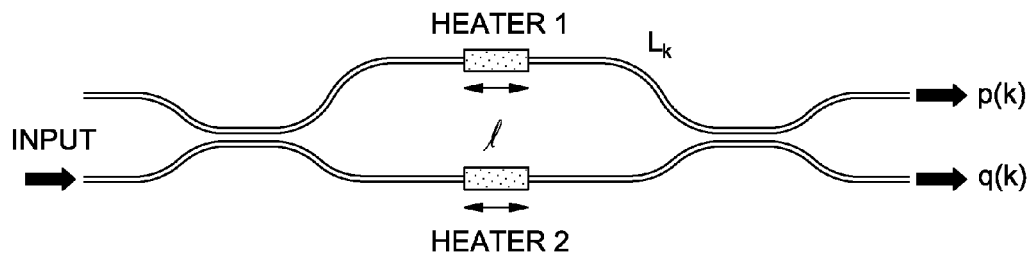
FIG. 2a depicts an MZI in the k-th stage.

In the above equation, A is a constant and $P(k)$ for $n = N \sim \hat{N}-1$ is assumed to be $P(\hat{N}-k)$. Since MZI responses for the signal in the upper half of FSR, $s(f_n)$ ($n=N\sim\hat{N}-1$), have identical spatial fringe representation to those of the signal in the lower half, only the lower half of the signal spectrum can be measured. Resolution of the spectrometer is given by of $\delta f = c/(\hat{N} n_c \Delta L)$, where $n_c$ and c are effective index of the waveguide and light velocity. Phase errors caused by effective-index fluctuations in the MZI array deteriorate the accuracy in the retrieved signal by Eq. (2). Phase error $\delta\phi_k$ in the k-th MZI is expressed as $\delta\phi_k = (2\pi/\lambda_0)\delta n_c(k) L_k$, where $\delta n_c(k)$ and $L_k$ denote effective-index fluctuation and MZI arm length as shown in FIG. 2a. A heater with length l can be placed outside of the chip on either one of the MZI arms to measure $\delta\phi_k$. The through port transmittance $q(k)$ under the thermo-optic effect is given by $$q(k) = \frac{1}{2}\left\{1 - \cos\frac{2\pi}{\lambda_0}[\alpha H l - \delta n_c(k) L_k]\right\}. \quad (3)$$

Figure 2B:
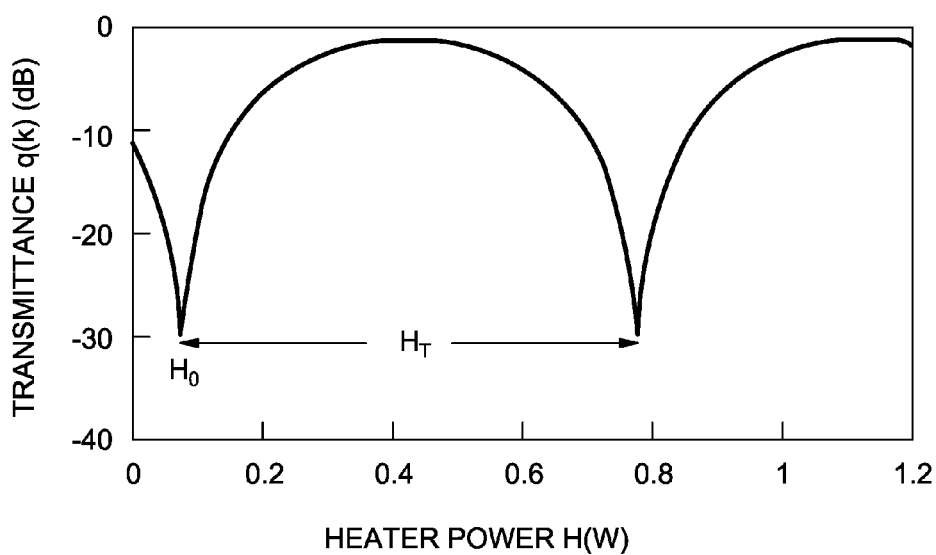
FIG. 2b is a graph showing response vs heater power.
Figure 3:
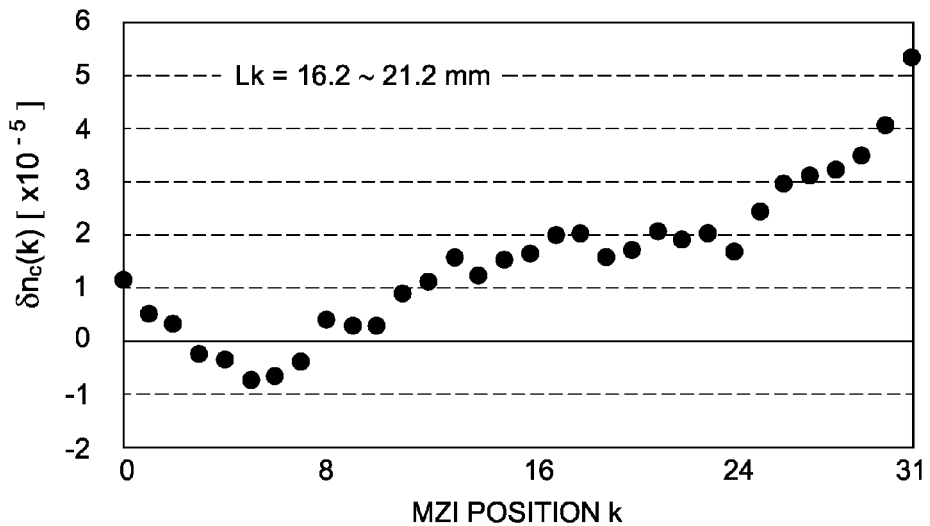
FIG. 3 is a graph showing measured effective-index fluctuation in the MZI array.

Here H is a heater power applied to the phase shifter, $\alpha$ is a coefficient of thermo-optic refractive index change per unit heater power and $\lambda_0 = c/f_0$, respectively. FIG. 2b shows an example of the thermo-optic phase scanning measurement. The first extinction point indicated by $H_0$ corresponds to the point at which the phase error is compensated for. The power between two adjacent extinction points $H_T$ corresponds to an optical path length change with $\lambda_0$. $\delta\phi_k$ is then given by $\delta\phi_k = 2\pi \cdot H_0/H_T$. Effective-index fluctuation is obtained as $\delta n_c(k) = (\delta\phi_k/L_k)\lambda_0/2\pi$. Measured $\delta\phi_c(k)$ in the MZI array is shown in FIG. 3. In one experiment, N=32, $\Delta L$=162 mm, and $\lambda_0$=1550.1 nm, respectively.

Figure 4:
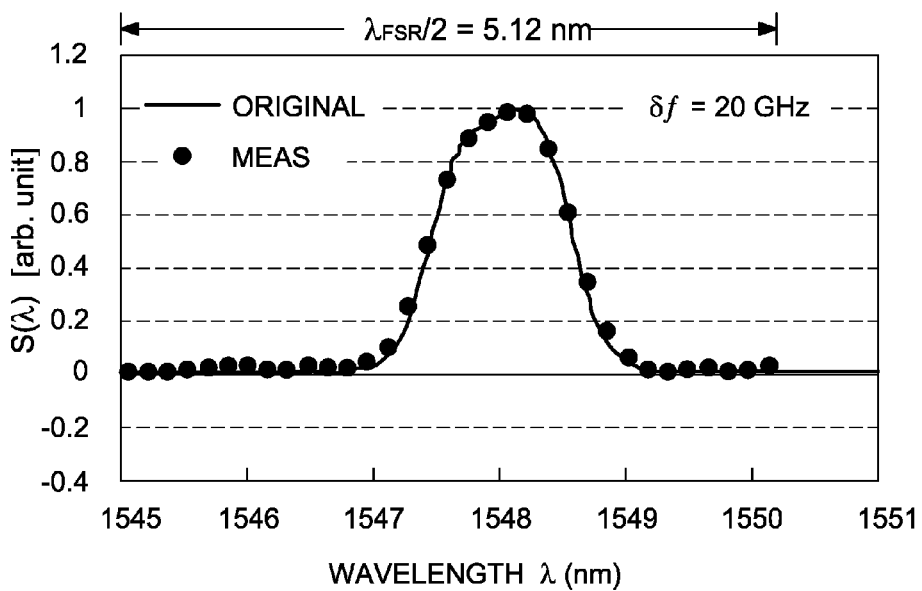
FIG. 4 is a graph showing signal spectrum corrected by considering the measured phase errors.

A discretized form of Eq. (1) including phase errors, $$P(k) = \frac{1}{S}\sum_{n=0}^{N-1} \frac{s(f_n)}{2}\left[1 + \cos\left(2\pi\frac{nk}{\hat{N}} + \delta\phi_k\right)\right] \quad (k = 0 \sim N-1), \quad (4)$$

can be solved by N×N simultaneous equations (deconvolution). Signal spectrum corrected with the above procedure is shown by the graph in FIG. 4. The main part of the spectrum is accurately retrieved. Some oscillatory noise features in the peripheral spectral regions may be caused by the imperfection of the deconvolution technique.

Figure 5:
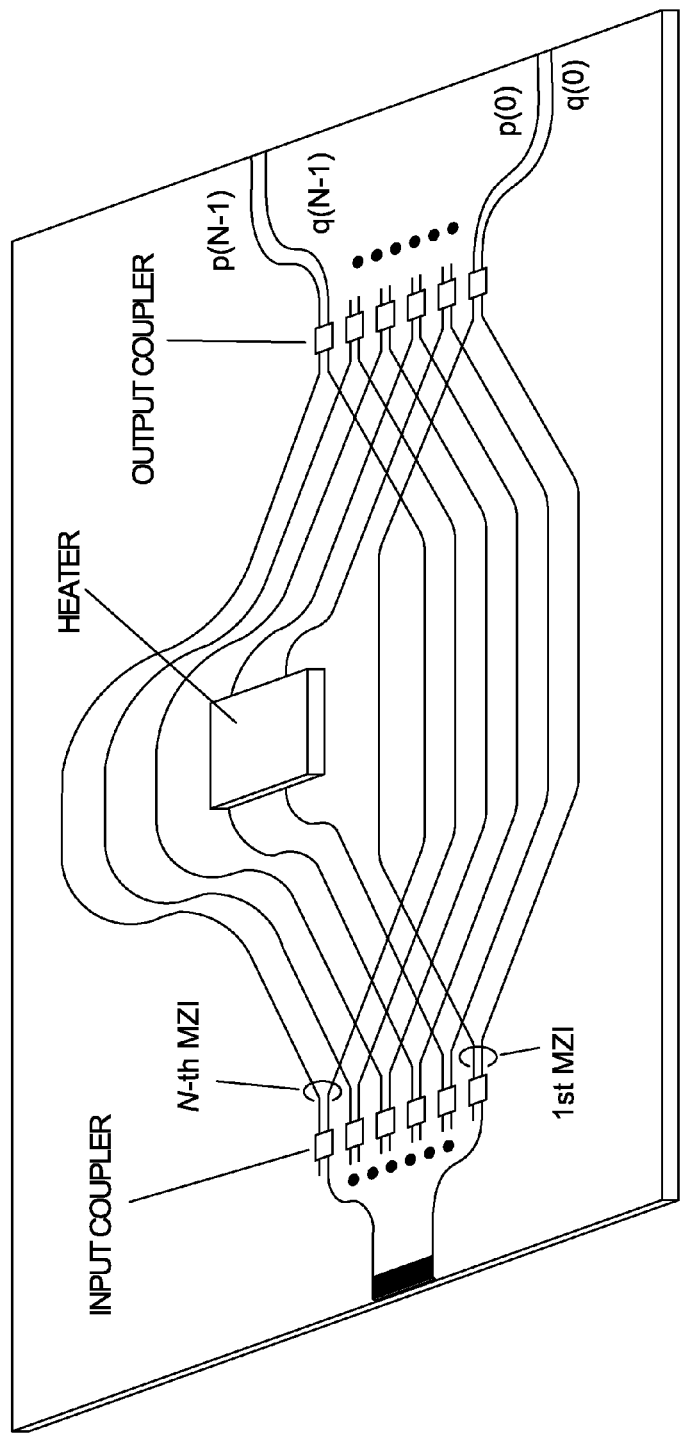
FIG. 5 is a schematic view of a configuration of the spectrometer using a phase shift technique in accordance with the present invention, wherein a micro heater is placed on the longer arms of the MZIs to induce the active phase shift through a thermo-optic effect.

The configuration of an exemplary planar waveguide SHS with an interleaved MZI array is shown in FIG. 5, wherein a micro heater chip is placed on the longer arms of the MZIs to induce the active phase shift through a thermo-optic effect. The number of Mach-Zehnder interferometers (MZIs) is N and the optical path differences between the two arms of the individual MZIs are designed to increase at equal increment of n, $\Delta L$ that is the geometrical length difference multiplied with the waveguide effective refractive index. The actual optical delay at each MZI on the fabricated spectrometer deviates from the designed one and we denote it as $kn_c\Delta L + \Delta_k$ for the (k+1)-th MZI with k=0, 1, 2, ..., N−1. Assume that the spectrum of a light source output to be measured is contained in a particular free spectral range (FSR) from $m/(n_c\Delta L)$ ($=\sigma_0$) to $(m+1)/(n_c\Delta L)$ in units of wavenumbers, where m is an integer and $\sigma_0$ is the Littrow wavenumber. FSR is divided into M parts so that the digitized wavenumbers are $\sigma_n = \sigma_0 + n/(Mn_c\Delta L)$ with n=0, 1, 2, ..., M−1, where the light intensities to be measured are $\{s_n\}$. The output powers from the respective cross and through ports at the output coupler of the (k+1)-th MZI are denoted as $p_k$ and $q_k$. When the propagation losses at each MZI are equal and the input and output couplers are ideal, the normalized power from the cross port output is represented by $$P_k^{(1)} = p_k/(p_k + q_k) = (1/2)\sum_{n=0}^{M-1} s_n(1 + \cos\varphi_{kn})$$

with $\phi_{kn} = 2\pi(kn_c\Delta L + \Delta_k)[\sigma_0 + n/(Mn_c\Delta L)]$ and $$\sum_{n=0}^{M-1} s_n = 1.$$

When $|\Delta_k|/\Delta L \ll 1$, as is usually the case, $\phi_{kn}$ is approximated as $2\pi km + 2\pi kn/M + \epsilon_k$ with $\epsilon_k = 2\pi\sigma_0\Delta_k$, resulting in $$P_k^{(1)} = \frac{1}{2}\sum_{n=0}^{M-1} s_n\left[1 + \cos\left(2\pi\frac{kn}{M} + \epsilon_k\right)\right]. \quad (5)$$

where $\epsilon_k$ is the phase error of the MZI. An auxiliary MZI is considered whose optical delay is different by sub-microns in length from that of the original MZI and so its phase error $\phi_k$ is different from $\epsilon_k$. The normalized output power from its cross port is $$P_k^{(Q)} = \frac{1}{2}\sum_{n=0}^{M-1} s_n\left[1 + \cos\left(2\pi\frac{kn}{M} + \phi_k\right)\right]. \quad (6)$$

From Eqs. (5) and (6), the respective real and imaginary parts $U_k^{(r)}$ and $U_k^{(i)}$ of $$U_k = \sum_{n=0}^{M-1} s_n \exp(j2\pi kn/M)$$

are obtained as $$U_k = U_k^{(r)} + jU_k^{(i)}, \quad (7\text{-}1)$$

$$U_k^{(r)} = \sum_{n=0}^{M-1} s_n \cos\left(2\pi\frac{kn}{M}\right) = 2[\Delta P_k^{(I)}\sin\phi_k - \Delta P_k^{(Q)}\sin\varepsilon_k]/\sin(\phi_k - \varepsilon_k), \quad (7\text{-}2)$$

$$U_k^{(i)} = \sum_{n=0}^{M-1} s_n \sin\left(2\pi\frac{kn}{M}\right) = 2[\Delta P_k^{(I)}\cos\phi_k - \Delta P_k^{(Q)}\cos\varepsilon_k]/\sin(\phi_k - \varepsilon_k), \quad (7\text{-}3)$$

where $$\Delta P_k^{(I)} = P_k^{(I)} - \frac{1}{2}\sum_{n=0}^{M-1} s_n \text{ and } \Delta P_k^{(Q)} = P_k^{(Q)} - \frac{1}{2}\sum_{n=0}^{M-1} s_n.$$

When $\phi_k-\varepsilon_k=\pi/2$, $\Delta P_k^{(Q)}$ is referred to as the signal in quadrature with respect to $\Delta P_k^{(I)}$. Once the real and imaginary parts of $U_k$ are obtained for all k, one can derive the power spectrum $\{s_n\}$ only by using the complex Fourier transformation as $$s_n = (1/M)\sum_{k=0}^{M-1} U_k \exp(-j2\pi kn/M)$$

without use of Lagrange interpolation nor de-convolution techniques. The active phase shift from $\varepsilon_k$ to $\phi_k$ is achieved by heating either arm of each MZI with a micro heater. The micro heater covers a single arm of the k-th MZI. Or, it may cover several waveguides as shown in FIG. 5 of upper (or lower) arms (unless it covers both arms of the k-th MZI simultaneously). Any known variants of microheating elements and controls can be used. The static phase shift is achieved by installing an auxiliary MZI with different optical delay for each MZI or by replacing the 2×2 output coupler with a hybrid 2×4 coupler at each MZI. (See M. Oguma, Y. Nasu, H. Takahashi, H. Kawakami, and E. Yoshida, "Single MZI-Based 1×4 DQPSK Demodulation," ECOC 2007, 10.33 (2007)) One need not make a precise adjustment of the phase shift to $\pi/2$ since one can measure both phase errors precisely and so derive $U_k$ from Eqs. (7).

To validate this phase shift technique, an active phase shift is conducted by placing a micro heater on the longer arms of the silica-based planar waveguide. Its design parameters and propagation characteristics have been described in detail in K. Okamoto, K. Takada, and H. Aoyagi, "Fabrication of Fourier-Transform Integrated-Optic Spatial Heterodyne Spectrometer On Silica-Based Planar Waveguide," Opt. Lett. vol. 35, no. 12, pp. 2103-2105 (2010). The number of the MZIs was N=32, the increment of the optical delay was $n_c\Delta L=240$ μm and every FSR was 1,250 GHz wide. Two kinds of light sources are used. One was a coherent laser whose frequency was set to the Littrow one at 193.4 THz. The other was an erbium-doped optical fiber amplifier coupled with an optical band-pass filter. The ASE from the amplifier passed through the filter to produce narrow band light whose FWHM was 150 GHz. The light spectrum to be measured was contained in the FSR with the Littrow frequency.

Figure 6:
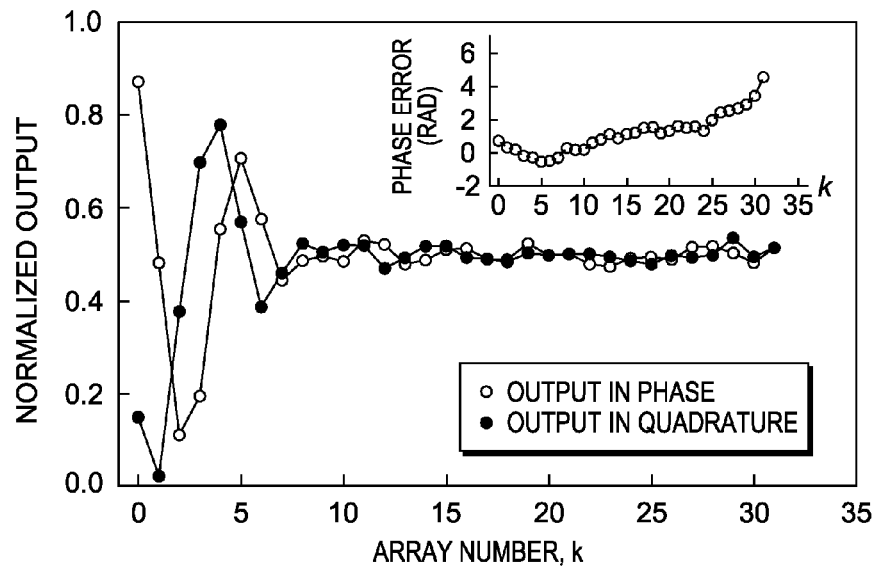
FIG. 6 is a graph of the normalized interference outputs from the arrayed MZIs when narrow-band light is launched (with an inset showing the measured phase error distribution)

The filtered light is launched into the first MZI and measured its respective through and cross port outputs $p_0$ and $q_0$ without heating and derived $P_0^{(I)}=p_0/(p_0+q_0)$. The laser light is then launched into the MZI. The cross-port output should be proportional to $1+\cos \varepsilon_0$ that is the component at n=0 in Eq. (5). The upper arm of the MZI is heated slightly and the original phase error $\varepsilon_0$ is estimated from the change between the cross port output powers before and after heating. (See T. Goh, 1. Suzuki, and A. Sugita, "Estimation of Waveguide Phase Error in Silica-Based Waveguides," J. Lightwave Technol. vol. 15, no. 11, pp. 2107-2113 (1997)) Once the phase error value $\varepsilon_0$ is determined, the cross port output at the phase error of $\varepsilon_0+\pi/2(=\phi_0)$ is available. Third, the current supplied to the heater is increased until the cross port output reached the estimated one. Finally the filtered light is launched into the MZI, and both powers $p_0$ and $q_0$ are measured while the arm was kept heated, and the output derived in quadrature by $P_0^{(Q)}=p_0/(p_0+q_0)$. These four steps can be repeated from the first to the last MZIs in sequence by sliding the heater upward, and obtained the series of data $\{P_k^{(I)}\}$ and $\{P_k^{(Q)}\}$ for k=0, 1, 2, ..., N-1 as show in FIG. 6.

The measured phase error distribution is also shown in the inset. DC components are subtracted in $\{P_k^{(I)}\}$ and $\{P_k^{(Q)}\}$ to obtain $\Delta P_k^{(I)}$ and $\Delta P_k^{(Q)}$, which is apodized by the window $W_k=0.5\{1+\cos[\pi k/(N-1)]\}$. The first N data in $\{U_k\}$ is derived by substituting them into Eq. (7), producing the complex series of 128 (=M) data $\{U_0, U_1, ..., U_{N-2}, U_{N-1}, 0, 0, ..., 0, 0, U^*_{N-1}, U^*_{N-2}, ..., U^*_2, U^*_1\}$ by filling zeros midrange, and performing its discrete complex Fourier transformation.

Figure 7:
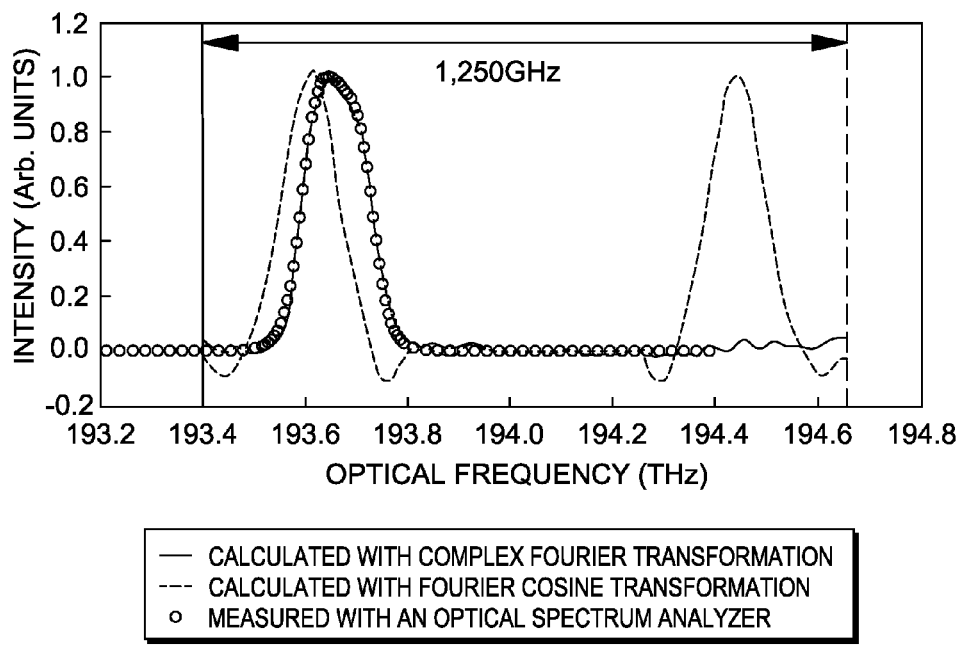
FIG. 7 is a graph showing a comparison between calculated and measured spectra.

The resultant power spectrum is shown in FIG. 7 together with an actual one measured with an optical spectrum analyzer.

The derived spectrum agreed very well with the measured one. Since the series of complex 256 data produced had no negative frequency components, the full span of one FSR was available for spectral measurement. The discrete Fourier cosine transformation was performed against the real series of 256 data $\{W_0\Delta P_0^{(I)}, W_1\Delta P_1^{(I)}, ..., W_{N-2}\Delta P_{N-2}^{(I)}, W_{N-1}\Delta P_{N-1}^{(I)}, 0, 0, ..., 0, 0, W_{N-1}\Delta P_{N-1}^{(I)}, W_{N-2}\Delta P_{N-2}^{(I)}, ..., W_2\Delta P_2^{(I)}, W_1\Delta P_1^{(I)}\}$ and the resultant spectrum is also shown in the figure. The spectrum became sharp due to the phase error and furthermore symmetrical with respect to the midrange of the FSR. This means that the available spectral range was one half of the FSR for the conventional method based on the Fourier cosine transformation.

The present invention in one aspect comprises the above phase shift technique for revealing the correct spectrum of a light launched into the planar waveguide SHS. The technique features generating the output in quadrature from each MZI and the complex Fourier transformation derives the spectrum directly. The method was confirmed experimentally with a silica-based planar waveguide SHS with 32 MZIs. The advantage of the technique is that the available spectral range is one free spectral range of the SHS and is twice as wide as that with the conventional method based on the Fourier cosine transformation.

In summary, a transform spectrometer measurement apparatus and method for a planar waveguide circuit (PLC) are disclosed. The spectrometer typically includes an input optical signal waveguide carrying an input optical signal; a plurality of couplers, each connected to the input optical signal waveguide, and each including a coupler output for carrying a coupled optical signal related to the input optical signal; and an array of interleaved, waveguide Mach-Zehnder interferometers (MZI), each having at least one input MZI waveguide, each MZI input waveguide receiving a coupled optical signal from a respective coupler output. A phase shifting circuit is applied to at least one arm of the MZIs to induce an active phase shift on the arm to thereby measure phase error in the MZIs. Light output from the MZIs is measured under intrinsic phase error conditions and after an active phase shift by the phase shifting circuit.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A transform spectrometer measurement apparatus implemented on a planar waveguide circuit (PLC), comprising:
    an input optical signal waveguide carrying an input optical signal;
    a plurality of couplers, each connected to the input optical signal waveguide, and each including a coupler output for carrying a coupled optical signal related to the input optical signal;
    an array of interleaved, waveguide Mach-Zehnder interferometers (MZI), each having at least one input MZI waveguide, each MZI input waveguide receiving a coupled optical signal from a respective coupler output;
    a phase shifting circuit applied to at least one arm of the MZIs to induce an active phase shift on said at least one arm to thereby measure phase error in said MZIs.

2. The apparatus of claim 1, wherein light output from the MZIs is measured under intrinsic phase error conditions and after an active phase shift by the phase shifting circuit.

3. The apparatus of claim 1, wherein the phase shifting circuit comprises a heater operating under a thermo-optic effect.

4. The apparatus of claim 3, wherein the heater is applied to a longer arm of an asymmetrical MZI.

5. The apparatus of claim 1, wherein at least some of the input MZI waveguides intersect in a common layer of the PLC, at an angle which allows their respective coupled optical signals to transmit without unacceptable attenuation.

6. The spectrometer of claim 5, wherein the input MZI waveguides intersect with each other at an angle greater than about 45°.

7. The spectrometer of claim 1, further comprising:
    dummy crossing waveguides placed such that the total number of waveguide crossings is equal for each MZI waveguide.

8. A method of measuring a transform spectrometer implemented on a planar waveguide circuit (PLC), comprising:
    providing an input optical signal waveguide carrying an input optical signal;
    providing a plurality of couplers, each connected to the input optical signal waveguide, and each including a coupler output for carrying a coupled optical signal related to the input optical signal;
    providing an array of interleaved, waveguide Mach-Zehnder interferometers (MZI), each having at least one input MZI waveguide, each MZI input waveguide receiving a coupled optical signal from a respective coupler output;
    using a phase shifting circuit applied to at least one arm of the MZIs to induce an active phase shift on said at least one arm to thereby measure phase error in said MZIs.

9. The method of claim 8, wherein light output from the MZIs is measured under intrinsic phase error conditions and after an active phase shift by the phase shifting circuit.

10. The method of claim 8, wherein the phase shifting circuit comprises a heater operating under a thermo-optic effect.

11. The method of claim 10, wherein the heater is applied to a longer arm of an asymmetrical MZI.

12. The method of claim 8, wherein at least some of the input MZI waveguides intersect in a common layer of the PLC, at an angle which allows their respective coupled optical signals to transmit without unacceptable attenuation.

13. The method of claim 12, wherein the input MZI waveguides intersect with each other at an angle greater than about 45°.

* * * * *